(12) United States Patent
Yamamoto

(10) Patent No.: US 12,060,050 B2
(45) Date of Patent: Aug. 13, 2024

(54) BRAKING CONTROL DEVICE FOR VEHICLE

(71) Applicant: ADVICS CO., LTD., Kariya (JP)

(72) Inventor: Yusaku Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 451 days.

(21) Appl. No.: 17/431,540

(22) PCT Filed: Feb. 12, 2020

(86) PCT No.: PCT/JP2020/005275
§ 371 (c)(1),
(2) Date: Aug. 17, 2021

(87) PCT Pub. No.: WO2020/175133
PCT Pub. Date: Sep. 3, 2020

(65) Prior Publication Data
US 2022/0194336 A1   Jun. 23, 2022

(30) Foreign Application Priority Data

Feb. 25, 2019 (JP) ................................ 2019-031468

(51) Int. Cl.
*B60T 8/1764* (2006.01)
*B60T 8/1766* (2006.01)
(Continued)

(52) U.S. Cl.
CPC .......... *B60T 8/1764* (2013.01); *B60T 8/1766* (2013.01); *B60T 8/266* (2013.01); *B60T 8/505* (2013.01);
(Continued)

(58) Field of Classification Search
CPC ... B60T 8/24; B60T 8/26; B60T 8/266; B60T 8/505; B60T 8/1764; B60T 8/1766; B60T 13/662; B60T 2240/06
(Continued)

(56) References Cited

U.S. PATENT DOCUMENTS

| 2011/0137513 | A1* | 6/2011 | Watanabe | B60W 30/045 |
| | | | | 701/31.4 |
| 2018/0072287 | A1* | 3/2018 | Boethel | B60T 8/268 |
| 2018/0072288 | A1* | 3/2018 | Boethel | B60T 13/10 |

FOREIGN PATENT DOCUMENTS

| JP | 2004299437 A | 10/2004 |
| JP | 2017109664 A | 6/2017 |

OTHER PUBLICATIONS

International Search Report (PCT/ISA/210) with translation and Written Opinion (PCT/ISA/237) mailed on Apr. 14, 2020, by the Japan Patent Office as the International Searching Authority for International Application No. PCT/JP2020/005275.

* cited by examiner

*Primary Examiner* — Robert A. Siconolfi
*Assistant Examiner* — San M Aung
(74) *Attorney, Agent, or Firm* — BUCHANAN INGERSOLL & ROONEY PC

(57) ABSTRACT

A braking control device includes: a control unit that is configured to control front-wheel braking power and rear-wheel braking power based on braking power distribution and requested braking power; a distribution setting unit that is configured to set the braking power distribution; and a slip judgment unit that is configured to judge whether or not the vehicle is in a rear-wheel-led slip state. If it is judged that the vehicle is in the rear-wheel-led slip state when the braking power distribution is first braking power distribution, the distribution setting unit executes a distribution shifting pro-
(Continued)

cess of shifting the braking power distribution to second braking power distribution within a predetermined period. The second braking power distribution is such distribution that the rear-wheel braking power is reduced relative to that observed when the first braking power distribution is set as the braking power distribution.

4 Claims, 5 Drawing Sheets

(51) Int. Cl.
  *B60T 8/26* (2006.01)
  *B60T 8/50* (2006.01)
  *B60T 13/66* (2006.01)
(52) U.S. Cl.
  CPC ......... *B60T 13/662* (2013.01); *B60T 2240/06* (2013.01)
(58) Field of Classification Search
  USPC ...................................................... 303/113.5
  See application file for complete search history.

BRAKING CONTROL DEVICE FOR VEHICLE

TECHNICAL FIELD

The present disclosure relates to a braking control device for a vehicle.

BACKGROUND ART

PTL 1 describes an example of a braking control device for a vehicle that is capable of adjusting distribution of braking power on each of a front wheel and a rear wheel of a vehicle at the time of braking of the vehicle. The braking power distribution indicates distribution between front-wheel braking power which is braking power to be applied on the front wheel and rear-wheel braking power which is braking power to be applied on the rear wheel. In this braking control device, when the vehicle pitches to the nose dive side due to braking of the vehicle, pitching reduction control of making the rear-wheel braking power larger than that based on normal braking power distribution is executed.

CITATION LIST

Patent Literature

PTL 1: JP-A-2017-109664

SUMMARY

Technical Problem

When the pitching reduction control as described above is executed, the rear-wheel braking power sometimes becomes larger than that observed at the time of braking of the vehicle based on ideal braking power distribution. The ideal braking power distribution is such braking power distribution that the front wheel and the rear wheel are locked at the same time. As a result of the pitching reduction control, if the braking power distribution becomes such distribution that the rear-wheel braking power is larger than that observed at the time of braking of the vehicle based on the ideal braking power distribution, the vehicle might become a rear-wheel-led slip state. The rear-wheel-led slip state indicates a state where the amount of slip of the front wheel is smaller than a slip judgment value and the amount of slip of the rear wheel is equal to or larger than the slip judgment value.

PTL 1 states that the device described in this literature increases the front-wheel braking power when it is judged that the vehicle becomes the rear-wheel-led slip state. When it is judged that the vehicle becomes the rear-wheel-led slip state during turning of the vehicle, if the speed of increase in the front-wheel braking power is high, the lateral force of the front wheel decreases drastically, and the speed of change in the difference between the front-wheel cornering force and the rear-wheel cornering force of the vehicle increases. If the difference between the front-wheel cornering force and the rear-wheel cornering force drastically changes during turning of the vehicle, there is a concern that the stability in the vehicle's turning behavior might be deteriorated.

Solution to Problem

A braking control device for a vehicle for solving the above problem includes: a control unit that is configured to respectively control front-wheel braking power, which is braking power to be applied on a front wheel, and rear-wheel braking power, which is braking power to be applied on a rear wheel, based on braking power distribution, which indicates distribution between the front-wheel braking power and the rear-wheel braking power, and requested braking power which indicates a braking power requested value for the vehicle; a distribution setting unit that is configured to set the braking power distribution; and a slip judgment unit that is configured to judge that the vehicle is in a rear-wheel-led slip state when the amount of slip of the front wheel is smaller than a slip judgment value while the amount of slip of the rear wheel is equal to or larger than the slip judgment value. In this braking control device, the distribution setting unit executes a distribution shifting process of shifting the braking power distribution to second braking power distribution within a predetermined period if it is judged that the vehicle is in the rear-wheel-led slip state when the braking power distribution is first braking power distribution. The second braking power distribution is such distribution that the rear-wheel braking power is reduced relative to that observed when the first braking power distribution is set as the braking power distribution.

According to the above configuration, if it is judged that the vehicle is in the rear-wheel-led slip state in a situation where the first braking power distribution is set as the braking power distribution at the time of braking of the vehicle, the braking power distribution is shifted to the second braking power distribution by executing the distribution shifting process. Even while the braking power distribution is shifted in this manner, the front-wheel braking power and the rear-wheel braking power are respectively controlled based on the braking power distribution at this time and the requested braking power. In other words, it is possible to increase the front-wheel braking power while taking the braking power distribution into consideration. Accordingly, even if it is judged that the vehicle is in the rear-wheel-led slip state during turning of the vehicle, it is possible to suppress a drastic decrease in the lateral force of the front wheel, which might otherwise occur due to an increase in the front-wheel braking power. Thus, it is possible to inhibit the speed of change in the difference between the front-wheel cornering force and the rear-wheel cornering force from becoming too high. Thereby, it is possible to suppress deviation between vehicle deceleration and target deceleration during the change of the braking power distribution while securing the stability in the vehicle's behavior.

DESCRIPTION OF EMBODIMENTS

Hereinbelow, an embodiment of a braking control device for a vehicle is described according to FIGS. 1 to 7.

Figure 1:
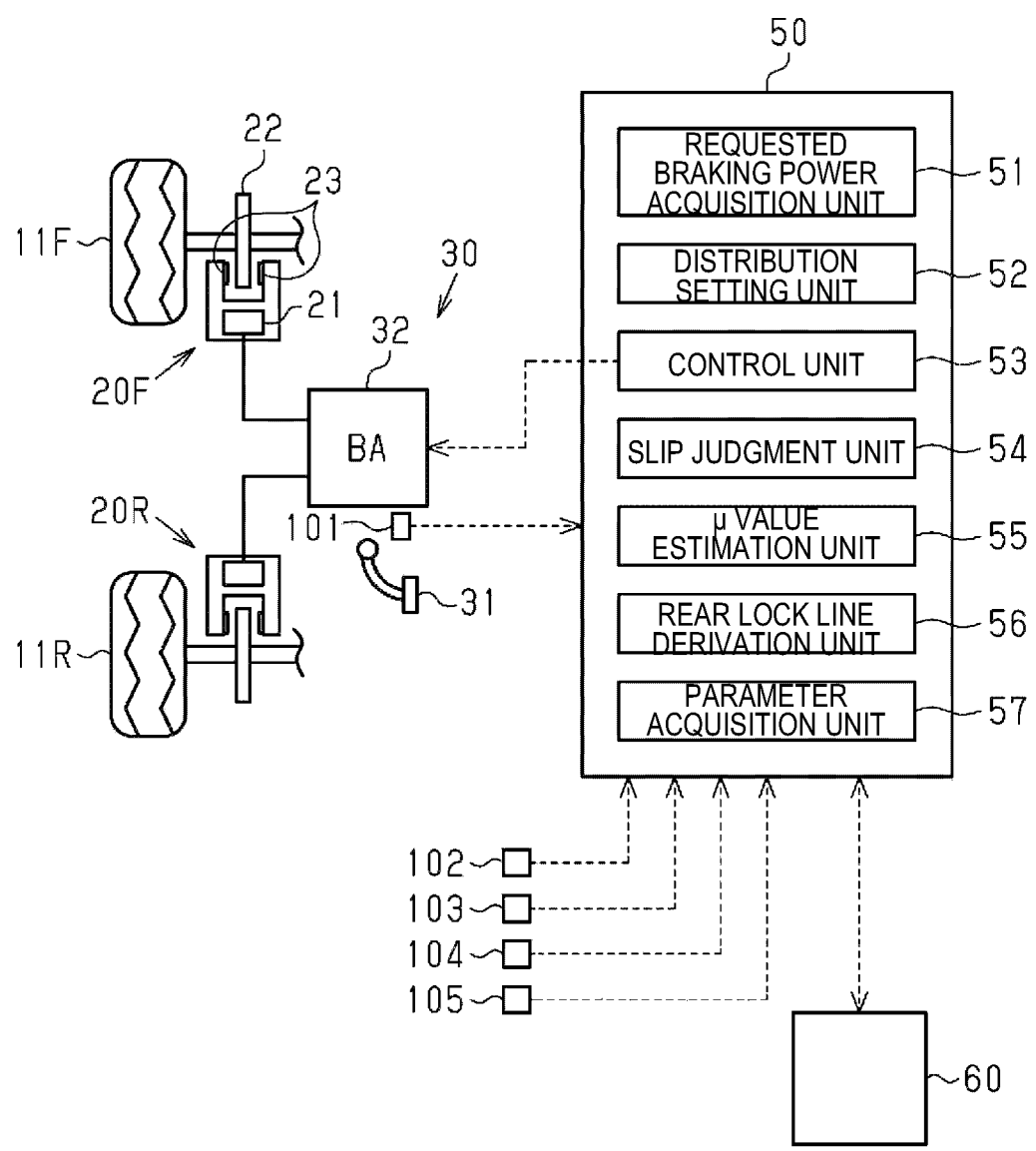
FIG. 1 is a diagram illustrating a functional configuration of an embodiment of a braking control device for a vehicle, and a schematic configuration of a vehicle equipped with the braking control device.

FIG. 1 illustrates a part of a vehicle equipped with a braking control device 50 of this embodiment. The vehicle includes: a braking device 30 that is controlled by the braking control device 50; a front-wheel braking mechanism 20F that is configured to apply braking power to a front wheel 11F; a rear-wheel braking mechanism 20R that is configured to apply braking power to a rear wheel 11R. Braking power to be applied to the front wheel 11F is referred to as "front-wheel braking power", and braking power to be applied to the rear wheel 11R is referred to as "rear-wheel braking power".

Each of the braking mechanisms 20F, 20R is configured in such a way that a pressing force of a friction member 23 against a rotary body 22 rotating together with the wheel 11F or 11R increases as a WC pressure being a hydraulic pressure inside a wheel cylinder 21 becomes higher. In other words, each of the braking mechanisms 20F, 20R can apply larger braking power to the wheel 11F or 11R as a WC pressure becomes higher.

The braking device 30 includes: a braking manipulation member 31 that is manipulated by a driver of the vehicle; and a braking actuator 32. Examples of the braking manipulation member 31 include a brake pedal. Each of the wheel cylinders 21 is connected to the braking actuator 32. The braking actuator 32 is capable of individually regulating a WC pressure inside each of the wheel cylinders 21.

Detection signals from various sensors are input to the braking control device 50. FIG. 1 illustrates, as such sensors: a manipulation amount sensor 101; a yaw rate sensor 102; a lateral acceleration sensor 103; a wheel speed sensor 104; and a steering angle sensor 105. The manipulation amount sensor 101 is configured to detect a braking manipulation amount INP indicating the amount of manipulation by which the braking manipulation member 31 is manipulated by the driver, and output, as a detection signal, a signal corresponding to the braking manipulation amount INP thus detected. The yaw rate sensor 102 is configured to detect a yaw rate YR of the vehicle, and output, as a detection signal, a signal corresponding to the yaw rate YR thus detected. The number of wheel speed sensors 104 provided is the same as the number of wheels 11F, 11R. Each of the wheel speed sensors 104 is configured to detect a wheel speed VW of the corresponding wheel, and output, as a detection signal, a signal corresponding to the wheel speed VW thus detected. The steering angle sensor 105 is configured to detect a steering angle STR indicating a turning angle of a steering wheel manipulated by the driver, and output, as a detection signal, a signal corresponding to the steering angle STR thus detected. The braking control device 50 controls the braking actuator 32 based on the detection signals from the various sensors 101 to 105.

The braking control device 50 transmits and receives various kinds of information to and from other control devices. For example, when the vehicle is traveling in an automatic driving mode, requested braking power BPCR indicating a braking power requested value for the vehicle is transmitted from a control device 60 for automatic driving to the braking control device 50. In this case, the braking control device 50 controls the braking actuator 32 based on the requested braking power BPCR thus received.

The braking control device 50 includes, as function units for actuating the braking actuator 32: a requested braking power acquisition unit 51; a distribution setting unit 52; a control unit 53; a slip judgment unit 54; a p value estimation unit 55; a rear lock line derivation unit 56; and a parameter acquisition unit 57.

The requested braking power acquisition unit 51 is configured to acquire requested braking power BPCR received from the control device 60 for automatic driving when the vehicle is traveling in the automatic driving mode. The requested braking power acquisition unit 51 is configured to calculate and acquire a value corresponding to a braking manipulation amount INP as requested braking power BPCR when the vehicle is traveling by the manipulation of the driver.

The distribution setting unit 52 is configured to set braking power distribution of the vehicle based on the traveling state of the vehicle and the posture thereof during traveling. The braking power distribution indicates distribution between front-wheel braking power BPF and rear-wheel braking power BPR. In this embodiment, the distribution setting unit 52 sets the braking power distribution through setting of a braking power distribution ratio X. The braking power distribution ratio X indicates a target value of the ratio of the rear-wheel braking power BPR in the requested braking power BPCR. Accordingly, if the rear-wheel braking power BPR is made equal to the requested braking power BPCR, a value of "1" is set as the braking power distribution ratio X. In contrast, if the front-wheel braking power BPF is made equal to the requested braking power BPCR, a value of "0 (zero)" is set as the braking power distribution ratio X. Note that, a method of setting the braking power distribution ratio X is to be described later.

The control unit 53 is configured to control the braking actuator 32 at the time of braking of the vehicle based on the requested braking power BPCR acquired by the requested braking power acquisition unit 51 and the braking power distribution ratio X, i.e., the braking power distribution set by the distribution setting unit 52.

In addition, the control unit 53 is configured to execute a rear-wheel slip reduction process for reducing deceleration slip of the rear wheel 11R when the front wheel 11F and the rear wheel 11R are applied with braking power as described above and such application of braking power reduces the wheel speed VW of the rear wheel 11R relative to a vehicle body speed VS and thus causes given deceleration slip on the rear wheel 11R. Further, the control unit 53 is configured to execute a front-wheel braking correction process for adjusting the front-wheel braking power BPF at the time of executing the rear-wheel slip reduction process on the rear wheel 11R. The contents of the rear-wheel slip reduction process and the front-wheel braking correction process are to be described later.

The slip judgment unit 54 is configured to judge whether or not the vehicle is in a rear-wheel-led slip state. The rear-wheel-led slip state indicates a state in which no given deceleration slip occurs on the front wheel 11F whereas given deceleration slip occurs on the rear wheel 11R. The slip judgment unit 54 calculates a value as the front wheel 11F's slip amount SLPF by subtracting the wheel speed VW of the front wheel 11F from the vehicle body speed VS. The slip judgment unit 54 calculates a value as the rear wheel 11R's slip amount SLPR by subtracting the wheel speed VW of the rear wheel 11R from the vehicle body speed VS. The vehicle body speed VS is calculated based on the wheel speed VW of each of the wheels 11F, 11R. Then, the slip judgment unit 54 judges that given deceleration slip occurs on the front wheel 11F if the front wheel 11F's slip amount SLPF is equal to or larger than a judgment slip amount SLPTh whereas does not judge that given deceleration slip occurs on the front wheel 11F if the slip amount SLPF is smaller than the judgment slip amount SLPTh. The slip judgment unit 54 judges that given deceleration slip occurs on the rear wheel 11R if the rear wheel 11R's slip amount SLPR is equal to or larger than the judgment slip amount SLPTh whereas does not judge that given deceleration slip occurs on the rear wheel 11R if the slip amount SLPR is smaller than the judgment slip amount SLPTh. In other words, the judgment slip amount SLPTh is a criterion for judgment on whether or not given deceleration slip occurs on each of the wheels 11F, 11R.

The μ value estimation unit 55 is configured to calculate an estimated road surface μ value RS being an estimated value of a μ value of a road surface on which the vehicle travels. In other words, the μ value estimation unit 55 calculates the estimated road surface μ value RS based on the rear-wheel braking power BPR, observed when the slip judgment unit 54 judges that the vehicle is in the rear-wheel-led slip state, and a rear-wheel load MR being a load that is input to the road surface from the vehicle body via the rear wheel 11R. The rear-wheel load MR is a value obtained from the vehicle's specifications, for example. A specific method of calculating the estimated road surface p value RS is to be described later.

The rear lock line derivation unit 56 is configured to derive, if the slip judgment unit 54 judges that the vehicle is in the rear-wheel-led slip state, a rear lock line LRR based on the estimated road surface μ value RS calculated by the μ value estimation unit 55. The rear lock line LRR is a line indicating the relationship between the rear-wheel braking power BPR and the front-wheel braking power BPF observed when the rear wheel 11R is locked. In other words, in a graph illustrated in FIG. 3 where the front-wheel braking power BPF is taken as a horizontal axis and the rear-wheel braking power BPR is taken as a vertical axis, the rear lock line LRR corresponds to a set of points representing the rear-wheel braking power BPR and the front-wheel braking power BPF observed when the rear wheel 11R is locked. Note that, the smaller the road surface μ value is, the lower the rear lock line LRR is located in the graph.

The parameter acquisition unit 57 is configured to acquire parameters indicating a yawing movement of the vehicle. The parameters mentioned here are parameters that affect the yawing movement of the vehicle. Such parameters include the steering angle STR, the steerable angle of the front wheel 11F, lateral acceleration GY, the yaw rate YR, a vehicle body slip angle ASL, and the vehicle body speed VS, for example.

Figure 2:
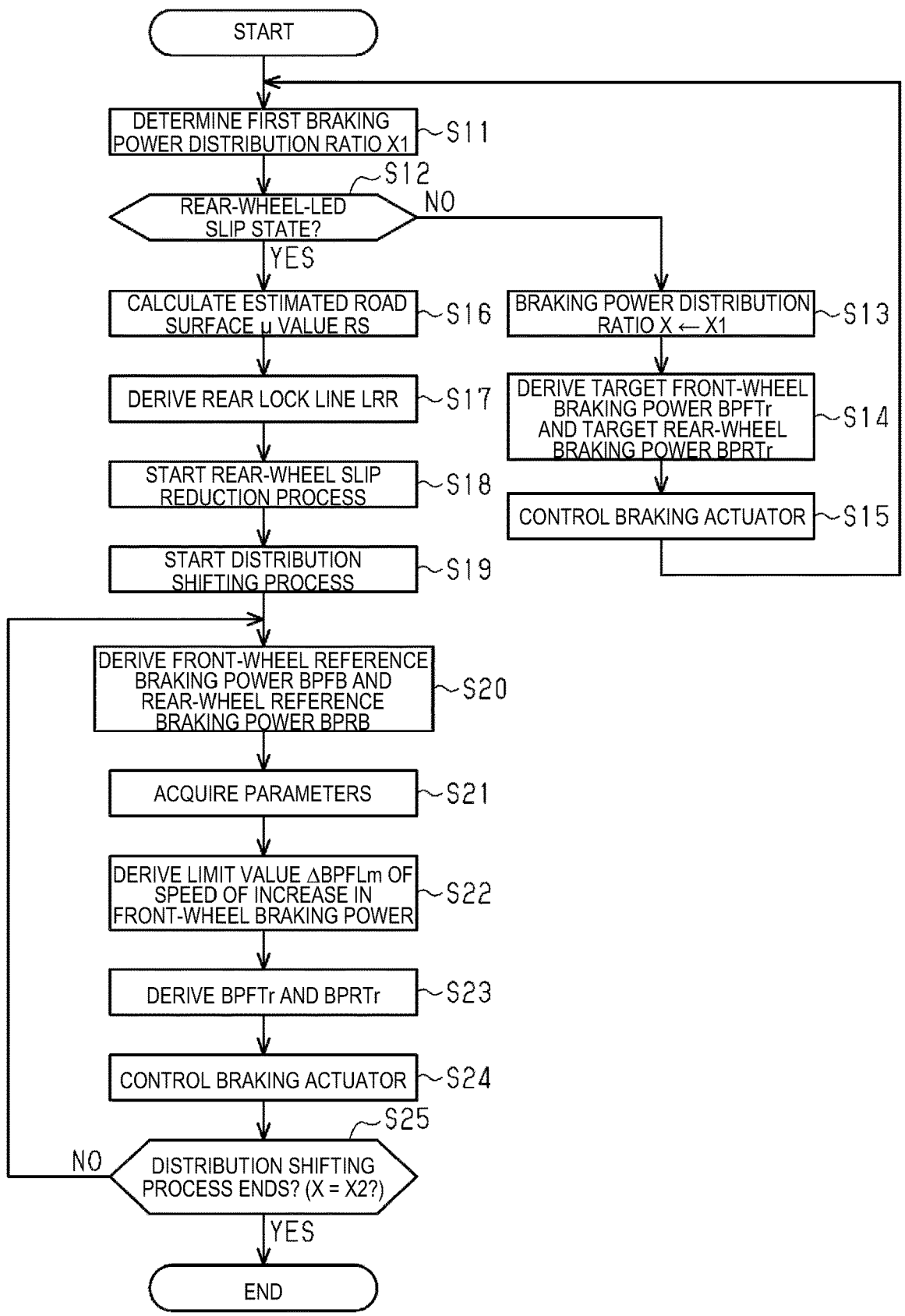
FIG. 2 is a flowchart for explaining a flow of a series of processes to be executed by the braking control device at the time of braking of the vehicle.

Next, with reference to FIG. 2, a description is given of a flow of processes observed when braking of the vehicle starts. The description given here is of the flow of processes before ending of a distribution shifting process to be described later.

First, in Step S11, a first braking power distribution ratio X1 which is a target value of a braking power distribution ratio at the time of start of braking of the vehicle is determined. The first braking power distribution ratio X1 is a braking power distribution ratio corresponding to "first braking power distribution". In this embodiment, the first braking power distribution ratio X1 is larger than an ideal braking power distribution ratio XID at the time of start of braking of the vehicle. The ideal braking power distribution ratio XID is a braking power distribution ratio used when the front wheel 11F and the rear wheel 11R are locked at the same time. In other words, the ideal braking power distribution ratio XID is a braking power distribution ratio corresponding to "ideal braking power distribution". Even when the requested braking power BPCR is the same, the rear-wheel braking power BPR observed when the front-wheel braking power BPF and the rear-wheel braking power BPR are controlled based on the first braking power distribution ratio X1 is larger than the rear-wheel braking power BPR observed when the front-wheel braking power BPF and the rear-wheel braking power BPR are controlled based on the ideal braking power distribution ratio XID.

The first braking power distribution ratio X1 may take the same value irrespective of when the vehicle is braked in response to braking manipulation of the driver or when the vehicle is braked in an automatic driving mode. Alternatively, the first braking power distribution ratio X1 used when the vehicle is braked in response to braking manipulation of the driver may differ from the first braking power distribution ratio X1 used when the vehicle is braked in an automatic driving mode.

Next, in Step S12, the slip judgment unit 54 judges whether or not the vehicle is in the rear-wheel-led slip state. If the slip judgment unit does not judge that the vehicle is in the rear-wheel-led slip state (S12: NO), the process transitions to the next Step S13. In Step S13, the distribution setting unit 52 sets the first braking power distribution ratio X1 as the braking power distribution ratio X. In other words, the first braking power distribution is set as the braking power distribution. Subsequently, in Step S14, the control unit 53 derives target front-wheel braking power BPFTr and target rear-wheel braking power BPRTr based on the braking power distribution ratio X and the requested braking power BPCR. The target front-wheel braking power BPFTr indicates a target of the front-wheel braking power BPF, and the target rear-wheel braking power BPRTr indicates a target of the rear-wheel braking power BPR. For example, the control unit 53 calculates the target front-wheel braking power BPFTr using the following relational formula (Formula 1), and calculates the target rear-wheel braking power BPRTr using the following relational formula (Formula 2). Accordingly, the target front-wheel braking power BPFTr becomes smaller as the braking power distribution ratio X increases, whereas the target rear-wheel braking power BPRTr becomes larger as the braking power distribution ratio X increases.

[Mathematic Formula 1]

$$BPFTr = BPCR \times (1-X) \quad \text{(Formula 1)}$$

$$BPRTr = BPCR - BPFTr \quad \text{(Formula 2)}$$

Then, in next Step S15, the control unit 53 controls the braking actuator 32 so that the front-wheel braking power BPF may follow the target front-wheel braking power BPFTr and the rear-wheel braking power BPR may follow the target rear-wheel braking power BPRTr. Then, the process transitions to Step S11 described above. In other words, while it is not judged that the vehicle is in the rear-wheel-led slip state, the front-wheel braking power BPF and the rear-wheel braking power BPR are each adjusted so that an actual braking power distribution ratio XR may be the first braking power distribution ratio X1, i.e., the actual braking power distribution may be the first braking power distribution.

On the other hand, if it is judged that the vehicle is in the rear-wheel-led slip state (YES) in Step S12, the process transitions to the next Step S16. In Step S16, the µ value estimation unit 55 calculates the estimated road surface µ value RS. At the timing when the rear wheel 11R's slip amount SLPR becomes equal to or larger than the judgment slip amount SLPTh and it is judged that the vehicle is in the rear-wheel-led slip state, the product of an actual road surface µ value RSR being an actual road surface µ value and an actual rear-wheel load MRR being an actual rear-wheel load is closely related to the rear-wheel braking power BPR. Thus, the µ value estimation unit 55 derives the estimated road surface µ value RS by dividing the rear-wheel braking power BPR by the rear-wheel load MR. In the next Step S17, the rear lock line derivation unit 56 derives, as the rear lock line LRR, a rear lock line estimated based on the estimated road surface µ value RS. Subsequently, in Step S18, the control unit 53 starts the rear-wheel slip reduction process.

In the next Step S19, the distribution setting unit 52 starts the distribution shifting process. In the distribution shifting process, the braking power distribution ratio X is shifted from the first braking power distribution ratio X1 to a second braking power distribution ratio X2 within a predetermined period. The second braking power distribution ratio X2 is a braking power distribution ratio corresponding to "second braking power distribution". The second braking power distribution ratio X2 is smaller than the first braking power distribution ratio X1. In this embodiment, the ideal braking power distribution ratio XID is set as the second braking power distribution ratio X2. For example, in the distribution shifting process, the braking power distribution ratio X is shifted to the second braking power distribution ratio X2 within a predetermined period TMA. In other words, the braking power distribution is shifted from the first braking power distribution to the second braking power distribution in the predetermined period TMA. The specific process contents of the distribution shifting process are to be described later. Once the distribution shifting process starts, the process transitions to the next Step S20.

In Step S20, the control unit 53 derives front-wheel reference braking power BPFB and rear-wheel reference braking power BPRB based on the braking power distribution ratio X, which has been shifted by the execution of the distribution shifting process, and the requested braking power BPCR. The front-wheel reference braking power BPFB is a reference value of the front-wheel braking power, and is calculated based on the current braking power distribution ratio X and the requested braking power BPCR. The rear-wheel reference braking power BPRB is a reference value of the rear-wheel braking power, and is calculated based on the current braking power distribution ratio X and the requested braking power BPCR. The derivation of the front-wheel reference braking power BPFB and the rear-wheel reference braking power BPRB is to be described later.

In next Step S21, the parameter acquisition unit 57 acquires various parameters.

Then, in Step S22, based on the parameters acquired in Step S21, the control unit 53 derives a limit value ΔBPFLm of the speed of increase in the front-wheel braking power BPF. The derivation of the limit value ΔBPFLm is included in the front-wheel braking correction process. The limit value ΔBPFLm is an upper bound of the amount of increase in the front-wheel braking power BPF per unit time. If the front-wheel braking power BPF is increased drastically when a large yaw moment is applied on the vehicle, the lateral force of the front wheel 11F decreases drastically, and a cornering force difference which is the difference between a front-wheel cornering force and a rear-wheel cornering force of the vehicle changes largely. The front-wheel cornering force is a cornering force of the front wheel 11F, and the rear-wheel cornering force is a cornering force of the rear wheel 11R. If the speed of change in the cornering force difference during turning of the vehicle is high, the stability in the vehicle's turning behavior might be deteriorated. On the other hand, when the yaw moment is small or the lateral acceleration GY is low, the cornering force generated in each of the wheels 11F, 11R itself is so small that a drastic increase in the front-wheel braking power BPF does not change the front-wheel cornering force so largely. Thus, the change in the cornering force difference is small, and the stability in the vehicle's turning behavior is not deteriorated so much. For this reason, the control unit 53 derives the limit value ΔBPFLm so that the limit value ΔBPFLm may be a value corresponding to at least one of the steering angle STR, the steerable angle of the front wheel 11F, the lateral acceleration GY, the yaw rate YR, the vehicle body slip angle ASL, and the vehicle body speed VS that are acquired as parameters. In other words, the control unit 53 reduces the limit value ΔBPFLm as the yaw moment that is presumed based on the parameters increases. For example, the control unit 53 reduces the limit value ΔBPFLm as the absolute value of the yaw rate YR increases. In addition, for example, the control unit 53 reduces the limit value ΔBPFLm as the vehicle body speed VS increases. Further, for example, the control unit 53 reduces the limit value ΔBPFLm as the absolute value of the steering angle STR increases.

Next, in Step S23, the control unit 53 derives the target front-wheel braking power BPFTr and the target rear-wheel braking power BPRTr. The derivation of the target rear-wheel braking power BPRTr mentioned here is included in the rear-wheel slip reduction process. In addition, the derivation of the target front-wheel braking power BPFTr mentioned here is included in the front-wheel braking correction process.

The control unit 53 derives the target rear-wheel braking power BPRTr so that it may be equal to or smaller than the rear-wheel reference braking power BPRB. When anti-lock braking control is executed on the rear wheel 11R as the rear-wheel slip reduction process, the control unit 53 derives the target rear-wheel braking power BPRTr based on how the rear wheel 11R's slip amount SLPR transitions. Meanwhile, control different from the anti-lock braking control on the rear-wheel 11R is executed, in some cases, as the rear-wheel slip reduction process. Examples of such different control include control of temporarily making the magnitude of the rear-wheel braking power BPR smaller than that determined according to the ideal braking power distribution ratio XID and then increasing the rear-wheel braking power BPR so that it may become closer to the rear-wheel reference braking power BPRB. When executing such control as the rear-wheel slip reduction process, the control unit 53 temporarily makes the magnitude of the target rear-wheel braking power BPRTr smaller than that determined according to the ideal braking power distribution ratio XID and then increases it so that it may become closer to the rear-wheel reference braking power BPRB.

In addition, the control unit 53 derives the target front-wheel braking power BPFTr so that it may be equal to or larger than the front-wheel reference braking power BPFB. For example, the control unit 53 derives the target front-wheel braking power BPFTr based on: a value obtained by subtracting the target rear-wheel braking power BPRTr from the rear-wheel reference braking power BPRB; the limit value ΔBPFLm described above; and the front-wheel reference braking power BPFB. In other words, within such a range that the difference between the latest value of the target front-wheel braking power BPFTr and the previous value of the target front-wheel braking power BPFTr does not exceed the limit value ΔBPFLm, the control unit 53 increases the latest value of the target front-wheel braking power BPFTr as the value obtained by subtracting the target rear-wheel braking power BPRTr from the rear-wheel reference braking power BPRB increases.

Then, once the target rear-wheel braking power BPRTr and the target front-wheel braking power BPFTr are derived, the process transitions to the next Step S24.

In Step S24, the control unit 53 actuates the braking actuator 32 so that the rear-wheel braking power BPR may follow the target rear-wheel braking power BPRTr and the front-wheel braking power BPF may follow the target front-wheel braking power BPFTr. The control of actuating the braking actuator 32 so that the rear-wheel braking power BPR may follow the target rear-wheel braking power BPRTr is included in the rear-wheel slip reduction process. The control of actuating the braking actuator 32 so that the front-wheel braking power BPF may follow the target front-wheel braking power BPFTr is included in the front-wheel braking correction process. Then, in the next Step S25, it is judged whether or not the distribution shifting process ends. For example, once the period having elapsed since the start of the distribution shifting process reaches the above predetermined period TMA, the shift of the braking power distribution to the second braking power distribution is completed, and therefore it is possible to judge that the distribution shifting process ends. If it is judged that the distribution shifting process ends (S25: YES), the series of processes illustrated in FIG. 2 is terminated. On the other hand, if it is not judged that the distribution shifting process ends (S25: NO), the process transitions to Step S20 described previously.

Next, a description is given of the distribution shifting process and how the front-wheel reference braking power BPFB and the rear-wheel reference braking power BPRB are derived while the distribution shifting process is executed.

Figure 3:
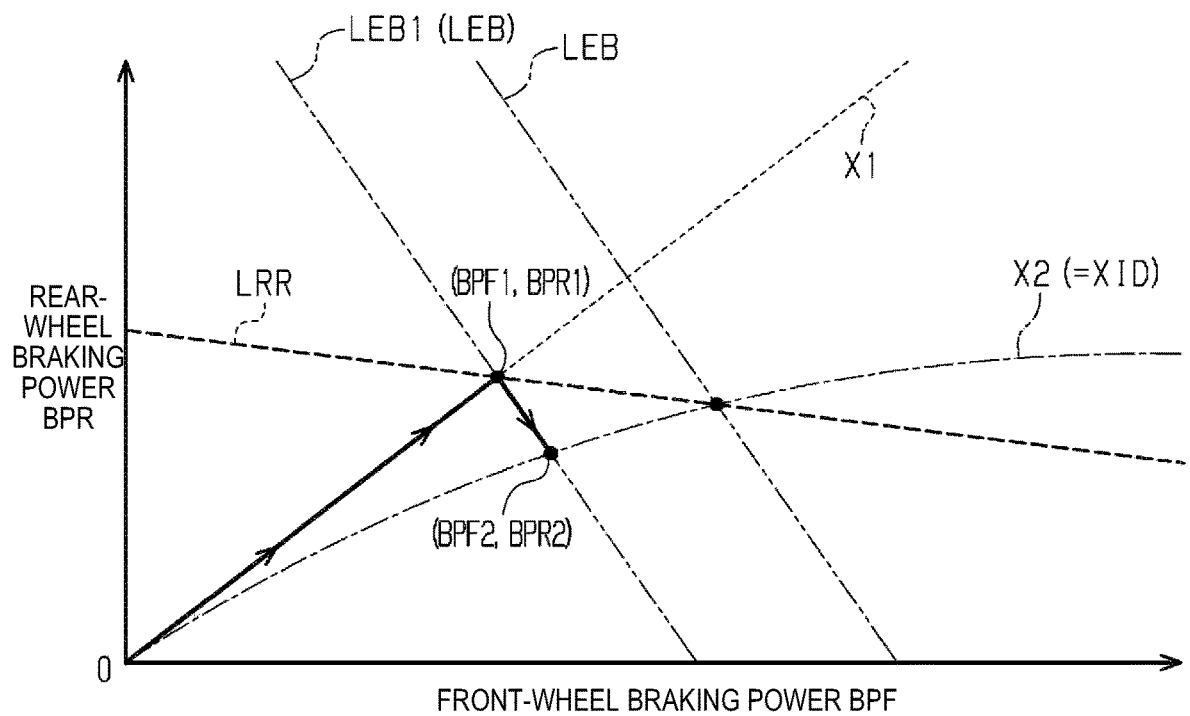
FIG. 3 is a graph illustrating an example of a shift of front-wheel-based braking power and rear-wheel-based braking power.

First, with reference to FIG. 3, a description is given of the distribution shifting process and how the front-wheel reference braking power BPFB and the rear-wheel reference braking power BPRB are derived while the distribution shifting process is executed, in the case where the requested braking power BPCR is increased until it is judged that the vehicle becomes the rear-wheel-led slip state and where the requested braking power BPCR is kept after this judgment is made.

When the requested braking power BPCR is increased in a state where the braking power distribution ratio X is the first braking power distribution ratio X1, the target front-wheel braking power BPFTr and the target rear-wheel braking power BPRTr are each increased according to the first braking power distribution ratio X1. In this case, in the graph of FIG. 3, points representing the target front-wheel braking power BPFTr and the target rear-wheel braking power BPRTr are located on a broken line representing the first braking power distribution ratio X1. In other words, as illustrated by arrows in a thick solid line in FIG. 3, the target front-wheel braking power BPFTr and the target rear-wheel braking power BPRTr are increased along with the increase of the requested braking power BPCR. Then, once the target front-wheel braking power BPFTr becomes first front-wheel braking power BPF1 and the target rear-wheel braking power BPRTr becomes first rear-wheel braking power BPR1, it is judged that the vehicle becomes the rear-wheel-led slip state and the distribution shifting process starts.

Chain double-dashed lines in FIG. 3 each indicate an equal braking power line LEB which is a set of points representing the front-wheel braking power BPF and the rear-wheel braking power BPR observed when they provide equal vehicle braking power (i.e., vehicle body acceleration). Out of the multiple equal braking power lines LEB illustrated in FIG. 3, a first equal braking power line LEB1 indicates an equal braking power line that corresponds to the requested braking power BPCR at the time when it is judged that the vehicle is in the rear-wheel-led slip state.

Once the distribution shifting process is executed, as illustrated by the arrows in the thick solid line in FIG. 3, the front-wheel reference braking power BPFB and the rear-wheel reference braking power BPRB are changed, respectively. In this case, the front-wheel reference braking power BPFB increases with a lapse of time, while the rear-wheel reference braking power BPRB decreases with a lapse of time. Then, at the time when a predetermined period elapses, the target front-wheel braking power BPFTr becomes second front-wheel braking power BPF2 and the target rear-wheel braking power BPRTr becomes second rear-wheel braking power BPR2. Since the front-wheel braking power BPF at the intersection point between a line indicating the second braking power distribution ratio X2 and the first equal braking power line LEB1 is the second front-wheel braking power BPF2 and the rear-wheel braking power BPR at this intersection point is the second rear-wheel braking power BPR2, the distribution shifting process is terminated. When the requested braking power BPCR is changed afterwards, since the second braking power distribution ratio X2 is set as the braking power distribution ratio X, the front-wheel reference braking power BPFB and the rear-wheel reference braking power BPRB are adjusted respectively according to the second braking power distribution ratio X2.

Figure 4A:
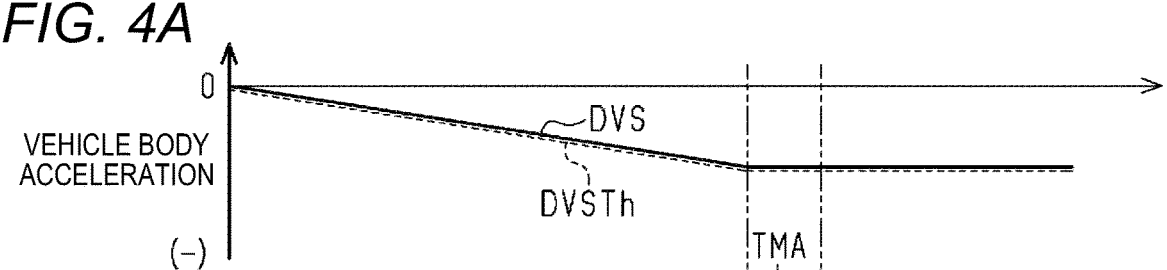
FIGS. 4A and 4B are exemplary timing charts observed when a distribution shifting process is executed at the time of braking of the vehicle.
Figure 4B:
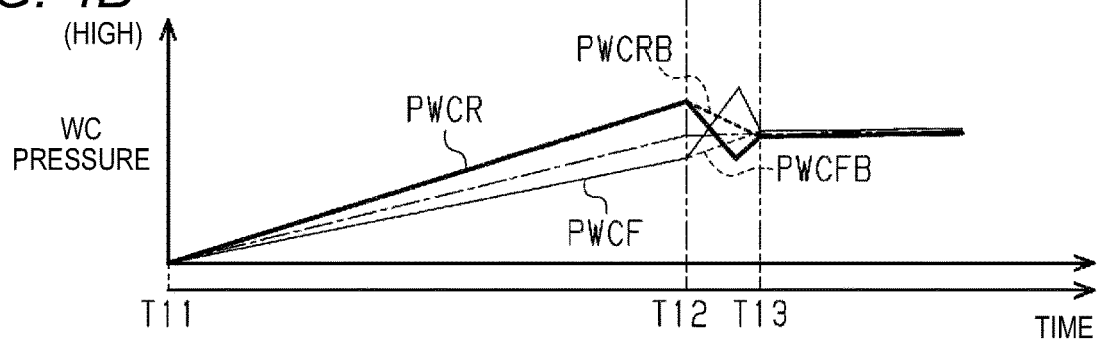

Next, with reference to FIGS. 4A and 4B, a description is given of the operation and effect obtained when the front-wheel reference braking power BPFB and the rear-wheel reference braking power BPRB are changed as described above. A chain line in FIG. 4B indicates the transition of each of a front-wheel WC pressure PWCF, which is the WC pressure inside the wheel cylinder 21 for the front wheel 11F, and a rear-wheel WC pressure PWCR, which is the WC pressure inside the wheel cylinder 21 for the rear wheel 11R, observed when braking control is executed in a state where the front-wheel WC pressure PWCF is equal to the rear-wheel WC pressure PWCR.

As illustrated in FIGS. 4A and 4B, when braking of the vehicle starts at a timing T11, the front-wheel WC pressure PWCF and the rear-wheel WC pressure PWCR are increased respectively based on the first braking power distribution ratio X1. Thereby, the front-wheel braking power BPF increases along with the increase of the target front-wheel braking power BPFTr, and the rear-wheel braking power BPR increases along with the increase of the target rear-wheel braking power BPRTr. Then, if it is judged that the vehicle is in the rear-wheel-led slip state at a timing T12, the distribution shifting process starts. With this process, as has been described with FIG. 3, the rear-wheel reference braking power BPRB is reduced and the front-wheel reference braking power BPFB is increased.

In the example illustrated in FIGS. 4A and 4B, control other than the anti-lock braking control is executed as the rear-wheel slip reduction process. Thus, the target rear-wheel braking power BPRTr is reduced so that its deviation from the rear-wheel reference braking power BPRB becomes larger, and then increased so that this deviation becomes smaller. Then, when the distribution shifting process ends, the target rear-wheel braking power BPRTr becomes as large as the rear-wheel reference braking power BPRB at this point. Meanwhile, when the rear-wheel slip reduction process is executed, the front-wheel braking correction process is executed. Thus, the target front-wheel braking power BPFTr is increased so that its deviation from the front-wheel reference braking power BPFB becomes larger, and then reduced so that this deviation becomes smaller. Then, when the distribution shifting process ends, the target front-wheel braking power BPFTr becomes as large as the front-wheel reference braking power BPFB at this point.

As illustrated in FIG. 4B, in a period from the timing T12 to a timing T13 in which the distribution shifting process is executed, the rear-wheel WC pressure PWCR varies in conjunction with the change in the target rear-wheel braking power BPRTr. In addition, the front-wheel WC pressure PWCF varies in conjunction with the change in the target front-wheel braking power BPFTr. In FIG. 4B, a front-wheel reference WC pressure PWCFB is the front wheel 11F's WC pressure corresponding to the front-wheel reference braking power BPFB, and a rear-wheel reference WC pressure PWCRB is the rear wheel 11R's WC pressure corresponding to the rear-wheel reference braking power BPRB. In the period in which the distribution shifting process is executed, the rear-wheel WC pressure PWCR varies within a range equal to or smaller than the rear-wheel reference WC pressure PWCRB, and the front-wheel WC pressure PWCF varies within a range equal to or larger than the front-wheel reference WC pressure PWCFB. By varying the rear-wheel WC pressure PWCR in this manner, it is possible to achieve a reduction in the rear wheel 11R's slip amount SLPR. In addition, while the distribution shifting process is executed, the front-wheel braking power BPF varies in conjunction with the variation of the rear-wheel braking power BPR as described above. For example, in the case where a value obtained by subtracting the target rear-wheel braking power BPRTr from the rear-wheel reference braking power BPRB is set as an operation value, when the operation value does not exceed the limit value ΔBPFLm of the speed of increase in the front-wheel braking power BPF, the sum of the operation value and the front-wheel reference braking power BPFB is set as the target front-wheel braking power BPFTr. On the other hand, when the operation value exceeds the limit value ΔBPFLm, the sum of the previous value of the target front-wheel braking power BPFTr and the limit value ΔBPFLm is set as the target front-wheel braking power BPFTr. Thereby, it is possible to inhibit vehicle body acceleration DVS from deviating from target vehicle body acceleration DVSTr during the shift of the braking power distribution.

Then, once the second braking power distribution ratio X2 is set as the braking power distribution ratio X at the timing T13, the distribution shifting process ends. In other words, once the ideal braking power distribution ratio XID is set as the braking power distribution ratio X, the distribution shifting process ends. In this embodiment, the braking power distribution gradually becomes closer to the second braking power distribution. Thus, it is possible to suppress a drastic change in the lateral force of the front wheel 11F, which might otherwise occur due to the change in the braking power distribution. Thereby, it is possible to inhibit the speed of change in the cornering force difference described above from becoming too high. Accordingly, it is possible to secure the stability in the behavior of the vehicle having been in the rear-wheel-led slip state.

In addition, in the example illustrated in FIGS. 4A and 4B, the target vehicle body acceleration DVSTr, i.e., the requested braking power BPCR is kept since the timing T12. Thus, since the timing T13 at which the distribution shifting process ends, each of the WC pressures PWCF and PWCR is kept, that is, each of the front-wheel braking power BPF and the rear-wheel braking power BPR is kept. This makes it possible to suppress a change in the vehicle body acceleration DVS during the change in the braking power distribution ratio X while securing the stability in the vehicle's behavior.

Figure 5:
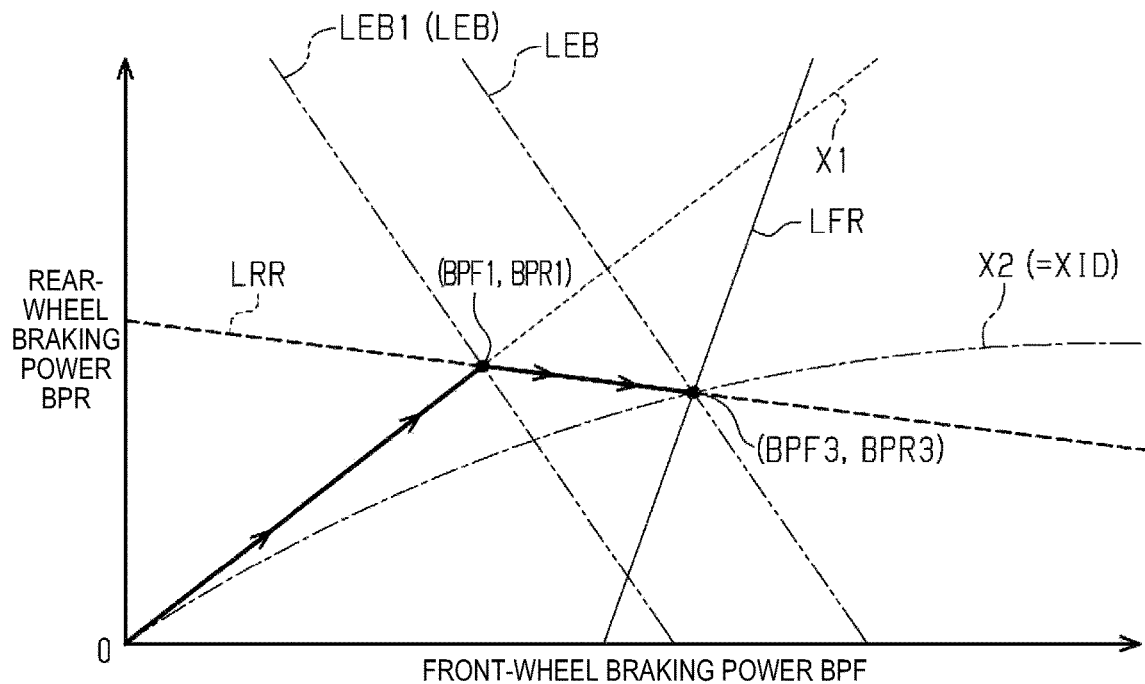
FIG. 5 is a graph illustrating an example of a shift of the front-wheel-based braking power and the rear-wheel-based braking power.

Next, with reference to FIG. 5, a description is given of the distribution shifting process and how the front-wheel reference braking power BPFB and the rear-wheel reference braking power BPRB are derived while the distribution shifting process is executed, in the case where the requested braking power BPCR is kept increased even after it is judged that the vehicle becomes the rear-wheel-led slip state.

Once it is judged that the vehicle is in the rear-wheel-led slip state, the distribution shifting process starts. If the requested braking power BPCR is increased even while the distribution shifting process is executed, the front-wheel reference braking power BPFB and the rear-wheel reference braking power BPRB are derived based on the rear lock line LRR that is derived by the rear lock line derivation unit 56 and the braking power distribution ratio X at this point. For example, in the graph of FIG. 5, the front-wheel braking power BPF and the rear-wheel braking power BPR at the intersection point between the line indicating the braking power distribution ratio X at this time and the rear lock line LRR are derived as the front-wheel reference braking power BPFB and the rear-wheel reference braking power BPRB, respectively. In other words, as illustrated by the arrows in the thick solid line in FIG. 5, the target front-wheel braking power BPFTr and the target rear-wheel braking power BPRTr are changed, respectively. In this graph, the rear lock line LRR is a line falling to the right. Thus, in the distribution shifting process in this case, the front-wheel reference braking power BPFB increases with a lapse of time, while the rear-wheel reference braking power BPRB decreases with a lapse of time. At the time when a predetermined period elapses, the target front-wheel braking power BPFTr becomes third front-wheel braking power BPF3 and the target rear-wheel braking power BPRTr becomes third rear-wheel braking power BPR3. Since the front-wheel braking power BPF at the intersection point between a line indicating the second braking power distribution ratio X2 and the rear lock line LRR is the third front-wheel braking power BPF3 and the rear-wheel braking power BPR at this intersection point is the third rear-wheel braking power BPR3, the distribution shifting process is terminated.

Note that, in the graph of FIG. 5, a thin solid line indicates a front lock line LFR. The front lock line LFR is a line indicating the relationship between the rear-wheel braking power BPR and the front-wheel braking power BPF observed when the front wheel 11F is locked. In this graph, the front lock line LFR passes through the intersection point between a line indicating the ideal braking power distribution ratio XID and the rear lock line LRR.

Figure 6A:
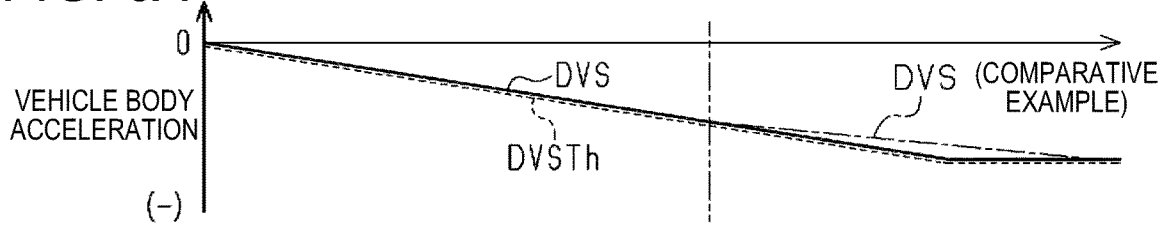
FIGS. 6A and 6B are exemplary timing charts observed when the distribution shifting process is executed at the time of braking of the vehicle.
Figure 6B:
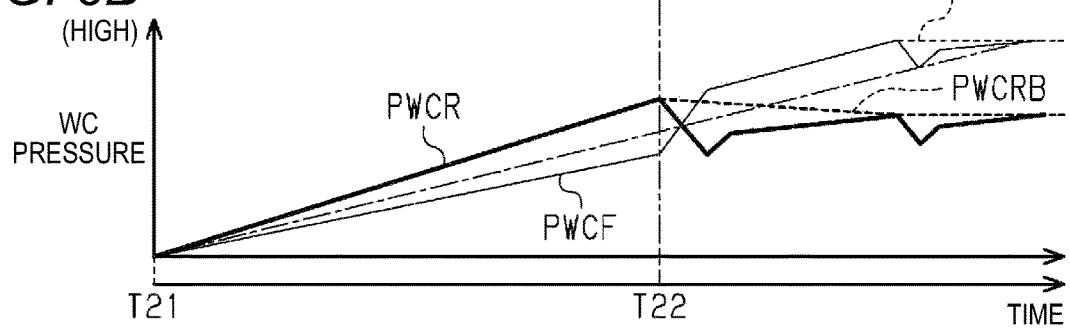

Next, with reference to FIGS. 6A and 6B, a description is given of the operation and effect obtained when the front-wheel reference braking power BPFB and the rear-wheel reference braking power BPRB are changed as described above. A chain line in FIG. 6B indicates the transition of each of the front-wheel WC pressure PWCF and the rear-wheel WC pressure PWCR observed when braking control is executed in a state where the front-wheel WC pressure PWCF is equal to the rear-wheel WC pressure PWCR.

As illustrated in FIGS. 6A and 6B, when braking of the vehicle starts at a timing T21, the front-wheel WC pressure PWCF and the rear-wheel WC pressure PWCR are increased respectively based on the first braking power distribution ratio X1. Then, if it is judged that the vehicle is in the rear-wheel-led slip state at a timing T22, the distribution shifting process starts. With this process, as has been described with FIG. 5, since the rear-wheel reference braking power BPRB and the front-wheel reference braking power BPFB are changed according to the rear lock line LRR, the rear-wheel reference braking power BPRB is reduced and the front-wheel reference braking power BPFB is increased.

In the example illustrated in FIGS. 6A and 6B, since the timing T22, the anti-lock braking control is executed on the rear wheel 11R as the rear-wheel slip reduction process. Once the anti-lock braking control is executed, a value obtained by subtracting the amount of control of the anti-lock braking control from the rear-wheel reference braking power BPRB is derived as the target rear-wheel braking power BPRTr. In other words, the target rear-wheel braking power BPRTr is set equal to or smaller than the rear-wheel reference braking power BPRB. Then, the rear-wheel WC pressure PWCR is changed so as to be in conjunction with the variation of the target rear-wheel braking power BPRTr. In this event, the rear-wheel WC pressure PWCR becomes not higher than the rear-wheel reference WC pressure PWCRB.

In this embodiment, when the anti-lock braking control is executed on the rear wheel 11R as the rear-wheel slip reduction process, the front-wheel braking correction process is executed in order to suppress a reduction in vehicle braking power BPC, which might otherwise occur due to the execution of the rear-wheel slip reduction process. Once the front-wheel braking correction process is executed, the target front-wheel braking power BPFTr becomes larger than the front-wheel reference braking power BPFB. In other words, while the anti-lock braking control is executed, when the target rear-wheel braking power BPRTr is reduced, the target front-wheel braking power BPFTr is increased faster than when the target rear-wheel braking power BPRTr is not reduced. As a result, as illustrated in FIG. 6B, while the anti-lock braking control is executed, the front-wheel WC pressure PWCF is increased drastically when the rear-wheel WC pressure PWCR is reduced. In this event, the front-wheel WC pressure PWCF is increased, i.e., the target front-wheel braking power BPFTr is increased so as to become larger as a value obtained by subtracting the rear-wheel braking power BPR from the rear-wheel reference braking power BPRB becomes larger.

Note that, FIG. 6A illustrates, by the chain line, the transition of the vehicle body acceleration DVS in a comparative example where the anti-lock braking control is executed on the rear wheel 11R while the target front-wheel braking power BPFTr is kept, i.e., the front-wheel WC pressure PWCF is kept at the time when it is judged that the vehicle is in the rear-wheel-led slip state. In the case of the comparative example, since the deviation between the rear-wheel braking power BPR and the rear-wheel reference braking power BPRB is not compensated on the front wheel 11F side, the absolute value of the vehicle body acceleration DVS becomes smaller than the absolute value of the target vehicle body acceleration DVSTr.

On the other hand, in this embodiment, by executing the front-wheel braking correction process, the deviation between the rear-wheel braking power BPR and the rear-wheel reference braking power BPRB can be compensated on the front wheel 11F side to some extent. Thereby, it is possible to suppress the deviation between the vehicle body acceleration DVS and the target vehicle body acceleration DVSTr in the case where the anti-lock braking control is executed on the rear wheel 11R since it is judged that the vehicle is in the rear-wheel-led slip state.

Meanwhile, when the braking power BPF and the braking power BPR of the wheels 11F and 11R become larger during turning of the vehicle, the lateral forces of the wheels 11F and 11R become smaller. On the other hand, when the braking power BPF and the braking power BPR of the wheels 11F and 11R become smaller, the lateral forces of the wheels 11F and 11R become larger. For this reason, when the rear-wheel braking power BPR is reduced by executing the rear-wheel slip reduction process and the front-wheel braking power BPF is increased by executing the front-wheel braking correction process, the lateral force of the rear wheel 11R becomes larger while the lateral force of the front wheel 11F becomes smaller. In addition, if the speed of change in the lateral force of the front wheel 11F is high, the yaw moment of the vehicle changes drastically, and therefore the stability in the vehicle's turning behavior might be deteriorated by the front-wheel braking correction process.

In this regard, in this embodiment, the limit value ΔBPFLm of the speed of increase in the front-wheel braking power BPF in the period where the rear-wheel braking power BPR is reduced by the anti-lock braking control is derived based on the parameters acquired by the parameter acquisition unit 57. Specifically, the larger the yaw moment applied on the vehicle is, the smaller the limit value ΔBPFLm becomes. Then, in the front-wheel braking correction process, the target front-wheel braking power BPFTr is derived so that the amount of increase in the target front-wheel braking power BPFTr per unit time may not exceed the limit value ΔBPFLm. Then, the front-wheel braking power BPF is adjusted so as to follow this target front-wheel braking power BPFTr. Accordingly, when the front-wheel braking correction process is executed, the deviation between the vehicle body acceleration DVS and the target vehicle body acceleration DVSTr might occur but a drastic change in the yaw moment applied on the vehicle can be suppressed, whereby the stability in the vehicle's turning behavior can be secured.

The above embodiment can be implemented while being modified in the following way. The above embodiment and the following modified examples can be implemented in combination with each other within a technically consistent scope.

In the above embodiment, using FIG. 5, the description has been given of the derivation of the front-wheel reference braking power BPFB and the rear-wheel reference braking power BPRB in the case where the requested braking power BPCR is increased even after it is judged that the vehicle is in the rear-wheel-led slip state. However, the requested braking power BPCR might become no longer increased before the second braking power distribution ratio X2 is set as the braking power distribution ratio X by executing the distribution shifting process. In this case, in the period where the requested braking power BPCR is increased after it is judged that the vehicle is in the rear-wheel-led slip state, as has been described in the above embodiment, the front-wheel reference braking power BPFB and the rear-wheel reference braking power BPRB are derived so that the points representing the front-wheel reference braking power BPFB and the rear-wheel reference braking power BPRB may be located on the rear lock line LRR. In addition, in the period from when the requested braking power BPCR becomes kept until the distribution shifting process ends, the front-wheel reference braking power BPFB and the rear-wheel reference braking power BPRB are derived based on the equal braking power line LEB which corresponds to the vehicle braking power BPC at the start of that period. Specifically, the front-wheel reference braking power BPFB and the rear-wheel reference braking power BPRB are derived so that the points representing the front-wheel reference braking power BPFB and the rear-wheel reference braking power BPRB may be located on the equal braking power line LEB.

In the case where the requested braking power BPCR is increased even after it is judged that the vehicle is in the rear-wheel-led slip state, the front-wheel reference braking power BPFB and the rear-wheel reference braking power BPRB may be derived in a manner different from the manner described in the above embodiment as long as the front-wheel reference braking power BPFB and the rear-wheel reference braking power BPRB are derived so that the points representing the front-wheel reference braking power BPFB and the rear-wheel reference braking power BPRB may not transition to the side where the rear-wheel braking power BPR is larger than that of the rear lock line LRR in the graph of FIG. 5. To put it another way, if the intersection point between the line indicating the braking power distribution ratio X shifted by the distribution shifting process and the equal braking power line LEB of the requested braking power BPCR at this point is located on the side where the rear-wheel braking power BPR is larger than that of the rear lock line LRR, the front-wheel braking power BPF and the rear-wheel braking power BPR at the intersection point between the line representing the braking power distribution ratio X and the rear lock line LRR are derived respectively as the front-wheel reference braking power BPFB and the rear-wheel reference braking power BPRB. On the other hand, if the intersection point between the line indicating the braking power distribution ratio X and the equal braking power line LEB of the requested braking power BPCR at this point is located on the rear lock line LRR or on the side where the rear-wheel braking power BPR is smaller than that of the rear lock line LRR, the front-wheel braking power BPF and the rear-wheel braking power BPR at this intersection point are derived respectively as the front-wheel reference braking power BPFB and the rear-wheel reference braking power BPRB.

In the above embodiment, the predetermined period TMA that is a period based on which it is judged whether or not a predetermined period elapses is fixed at the value previously set. However, the predetermined period TMA may be variable. For example, the predetermined period TMA may be set longer as the speed of increase in the requested braking power BPCR is lower. Alternatively, for example, the predetermined period TMA may be set longer as the yaw moment applied on the vehicle, which is presumable based on the above parameters, is larger.

The limit value ΔBPFLm does not necessarily have to be varied based on the above parameters.

Figure 7:
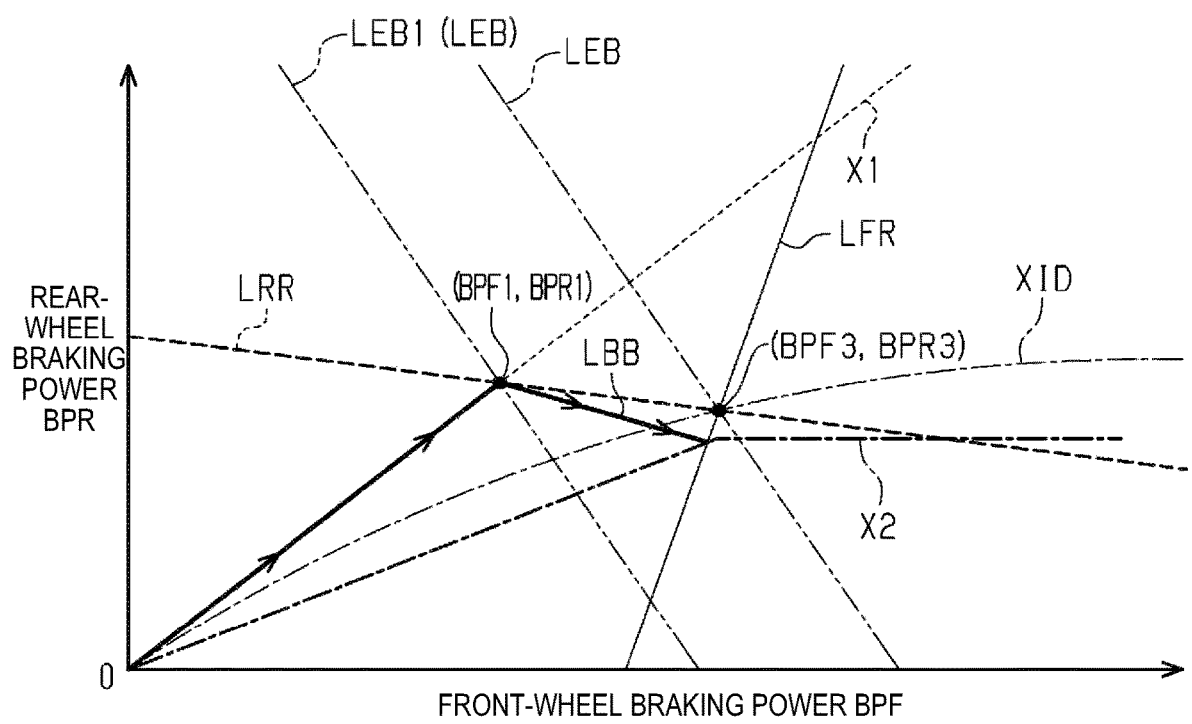
FIG. 7 is a graph illustrating an example of a shift of the front-wheel-based braking power and the rear-wheel-based braking power.

The second braking power distribution may be different from the ideal braking power distribution as long as this distribution can make the rear-wheel braking power BPR smaller than that obtained at the time of braking of the vehicle in the first braking power distribution. In other words, the second braking power distribution ratio X2 may take a value different from the ideal braking power distribution ratio XID as long as it is smaller than the first braking power distribution ratio X1. FIG. 7 illustrates an example of the case where a value smaller than the ideal braking power distribution ratio XID is set as the second braking power distribution ratio X2. As illustrated in FIG. 7, in the case where the requested braking power BPCR is increased even after it is judged that the vehicle is in the rear-wheel-led slip state, the rear lock line LRR is derived as in the case of the above embodiment. In the example illustrated in FIG. 7, the intersection point between the line representing the second braking power distribution ratio X2 and the rear lock line LRR is located on the side where the front-wheel braking power BPF is larger than that of the front lock line LFR. The front lock line LFR passes through the intersection point between the line representing the ideal braking power distribution ratio XID and the rear lock line LRR. In other words, the front lock line LFR can be derived based on the rear lock line LRR and the ideal braking power distribution ratio XID. Then, the intersection point between the line representing the second braking power distribution ratio X2 and the front lock line LFR is derived, and a line that connects this intersection point and the point representing the front-wheel braking power BPF and the rear-wheel braking power BPR at the time when it is judged that the vehicle is in the rear-wheel-led slip state is derived as a reference braking power line LBB. Then, during the distribution shifting process, the front-wheel reference braking power BPFB and the rear-wheel reference braking power BPRB are derived so that the points representing the front-wheel reference braking power BPFB and the rear-wheel reference braking power BPRB may be located on the reference braking power line LBB.

In the above embodiment, the first braking power distribution ratio X1 is set so that braking power is applied on both of the front wheel 11F and the rear wheel 11R even when the first braking power distribution ratio X1 is set as the braking power distribution ratio X. However, the first braking power distribution ratio X1 may be such braking power distribution ratio that the front-wheel braking power BPF may be "0".

The braking device may have any configuration as long as it can individually control braking power to be applied on each of the wheels 11F and 11R. For example, the braking device may be an electric braking device capable of applying frictional braking power on each of the wheels 11F and 11R without using brake fluid.

The front-wheel braking power BPF may be the sum of frictional braking power applied on the front wheel 11F by the actuation of the front-wheel braking mechanism 20F and regenerative braking power applied on the front wheel 11F by power generated by a generator.

The rear-wheel braking power BPR may be the sum of frictional braking power applied on the rear wheel 11R by the actuation of the rear-wheel braking mechanism 20R and regenerative braking power applied on the rear wheel 11R by power generated by the generator.

The invention claimed is:

1. A braking control device for a vehicle comprising:
a control unit that is configured to respectively control front-wheel braking power, which is braking power to be applied on a front wheel, and rear-wheel braking power, which is braking power to be applied on a rear wheel, based on braking power distribution, which indicates distribution between the front-wheel braking power and the rear-wheel braking power, and requested braking power which indicates a braking power requested value for the vehicle;

a distribution setting unit that is configured to set the braking power distribution; and a slip judgment unit that is configured to judge that the vehicle is in a rear-wheel-led slip state when the amount of slip of the front wheel is smaller than a slip judgment value while the amount of slip of the rear wheel is equal to or larger than the slip judgment value, wherein the distribution setting unit executes a distribution shifting process of shifting the braking power distribution to second braking power distribution within a predetermined period if it is judged that the vehicle is in the rear-wheel-led slip state when the braking power distribution is first braking power distribution, the second braking power distribution is such distribution that the rear-wheel braking power is reduced relative to that observed when the first braking power distribution is set as the braking power distribution, and when the distribution shifting process is executed, the control unit respectively derives rear-wheel reference braking power, which is a reference value of the rear-wheel braking power, and front-wheel reference braking power, which is a reference value of the front-wheel braking power, based on the braking power distribution having been shifted and the requested braking power, and controls the rear-wheel braking power so that the rear-wheel braking power is equal to or smaller than the rear-wheel reference braking power, and controls the front-wheel braking power so that the front-wheel braking power is equal to or larger than the front-wheel reference braking power.

2. The braking control device for a vehicle according to claim 1, further comprising:

a μ value estimation unit that is configured to calculate, if it is judged that the vehicle is in the rear-wheel-led slip state when the braking power distribution is the first braking power distribution, an estimated road surface μ value, which is an estimated value of a μ value of a road surface, based on a rear-wheel load, which is a vertical component load applied on the road surface from a vehicle body via the rear wheel, and the rear-wheel braking power; and a rear lock line derivation unit that is configured to derive a rear lock line, which is a line indicating the relationship between the rear-wheel braking power and the front-wheel braking power observed when the rear wheel is locked, based on the estimated road surface μ value thus calculated, wherein the second braking power distribution is ideal braking power distribution being such braking power distribution that the front wheel and the rear wheel are locked at the same time, and if the requested braking power is increased even while the distribution shifting process is executed, the control unit derives the rear-wheel reference braking power, which is a reference value of the rear-wheel braking power, and the front-wheel reference braking power, which is a reference value of the front-wheel braking power, so that points representing the rear-wheel reference braking power and the front-wheel reference braking power are located on the rear lock line, and controls the rear-wheel braking power so that the rear-wheel braking power is equal to or smaller than the rear-wheel reference braking power, and controls the front-wheel braking power so that the front-wheel braking power is equal to or larger than the front-wheel reference braking power.

3. The braking control device for a vehicle according to claim 1, wherein, when the distribution shifting process is executed, the control unit executes a rear-wheel slip reduction process of reducing the amount of slip of the rear wheel by varying the rear-wheel braking power on the basis of the rear-wheel reference braking power, and when executing the rear-wheel slip reduction process, executes a front-wheel braking correction process of making the front-wheel braking power larger than the front-wheel reference braking power based on a value obtained by subtracting the rear-wheel braking power from the rear-wheel reference braking power.

4. The braking control device for a vehicle according to claim 3, further comprising a parameter acquisition unit that is configured to acquire a parameter indicating a yawing movement of the vehicle, wherein in the front-wheel braking correction process, the control unit adjusts the front-wheel braking power so that a difference between the front-wheel reference braking power and the front-wheel braking power may be changed with a change speed according to the parameter.

* * * * *